United States Patent
Harmon et al.

[11] Patent Number: 5,421,055
[45] Date of Patent: Jun. 6, 1995

[54] VARIABLE PRESSURE WINDSHIELD WIPER ARM

[75] Inventors: Daniel L. Harmon, Kettering; Douglas D. Patterson, Centerville, both of Ohio

[73] Assignee: ITT Automotive Electrical Systems Inc., Auburn Hills, Mich.

[21] Appl. No.: 116,838

[22] Filed: Sep. 7, 1993

[51] Int. Cl.6 .............................. B60S 1/32; B60S 1/34
[52] U.S. Cl. .............................. 15/250.20; 15/250.35; 15/250.31; 192/84 B
[58] Field of Search ............ 15/250.20, 250.35, 250.19, 15/250.34, 250.33, 250.30; 192/84 B

[56] References Cited

U.S. PATENT DOCUMENTS

| | | | |
|---|---|---|---|
| 3,044,593 | 7/1962 | Scarrott et al. | 192/84 B |
| 4,718,139 | 1/1988 | Okuda et al. | 15/250.2 |
| 4,736,484 | 4/1988 | Bauer et al. | 15/250.2 |
| 4,791,697 | 12/1988 | Fry | 15/250.2 |
| 4,993,102 | 2/1991 | Honda et al. | 15/250.2 |

FOREIGN PATENT DOCUMENTS

| | | | |
|---|---|---|---|
| 145647 | 8/1984 | Japan | 15/250.2 |
| 167349 | 9/1984 | Japan | 15/250.2 |
| 20252 | 1/1988 | Japan | 15/250.2 |
| 241859 | 9/1990 | Japan | 15/250.2 |
| 70653 | 3/1991 | Japan | 15/250.2 |
| 118338 | 4/1992 | Japan | 15/250.2 |

*Primary Examiner*—David A. Scherbel
*Assistant Examiner*—Gary K. Graham
*Attorney, Agent, or Firm*—Dykema Gossett

[57] ABSTRACT

An automotive windshield wiper system with adjustable wiping pressure includes a drive shaft, a head rigidly mounted to the drive shaft for unitary rotation therewith, a wiper arm pivotally connected to the head at a first end and retaining a wiper blade at a second end, and a spring between the head and the wiper arm inducing a force pivoting the wiper arm toward an associated wiping surface. A controller is disposed between the spring and the head and relies exclusively on the relative rotation between the wiper arm and the vehicle body as a source of all motive power to selectively displace an end of the spring and thereby vary the force on the wiper arm.

2 Claims, 2 Drawing Sheets

VARIABLE PRESSURE WINDSHIELD WIPER ARM

BACKGROUND OF THE INVENTION

1. Field of the Invention

This invention relates generally to automotive windshield wiper systems. In particular, the present invention is concerned with a mechanism for varying the blade tip force of a wiper arm.

2. Description of the Related Art

Conventional windshield wiper systems typically have a drive shaft, a head mounted on the drive shaft for unitary rotation therewith, a wiper arm pivotally mounted on the head at a first end and retaining a wiper blade at a second end, and a spring between the head and wiper arm pivoting the wiper arm to press the blade against the windshield. The spring generally produces a near constant force on the wiper arm urging the blade toward the windshield.

It is desirable to vary the tip force on a windshield wiper blade to reduce chatter, blade set, wind-lift, system noise, and improve wipe quality at high vehicle speeds. Furthermore, it is desirable to selectively vary the tip force dependent on vehicle operating conditions. Conventional devices so doing typically require a dedicated rotary electric motor to displace an end of the spring in a direction providing a desired increase or decrease of spring force on the wiper arm.

SUMMARY OF THE INVENTION

The present invention includes a mechanism for varying the blade tip force of a windshield wiper without adding an electric motor to a conventional wiper system. The mechanism utilizes the motion of a drive shaft in current wiper systems. The mechanism is designed to fit into existing packaging spaces.

In a preferred embodiment, an automotive windshield wiper system with adjustable wiping pressure includes a drive shaft, a head rigidly mounted to the drive shaft for unitary rotation therewith, a wiper arm pivotally connected to the head at a first end and retaining a wiper blade at a second end, and a spring between the head and the wiper arm inducing a force pivoting the wiper arm toward an associated wiping surface. A controller is disposed between the spring and the head and relies exclusively on the relative rotation between the wiper arm and the vehicle body as a source of all motive power to selectively displace an end of the spring and thereby vary the force on the wiper arm.

DESCRIPTION OF THE PREFERRED EMBODIMENT

Figure 1:
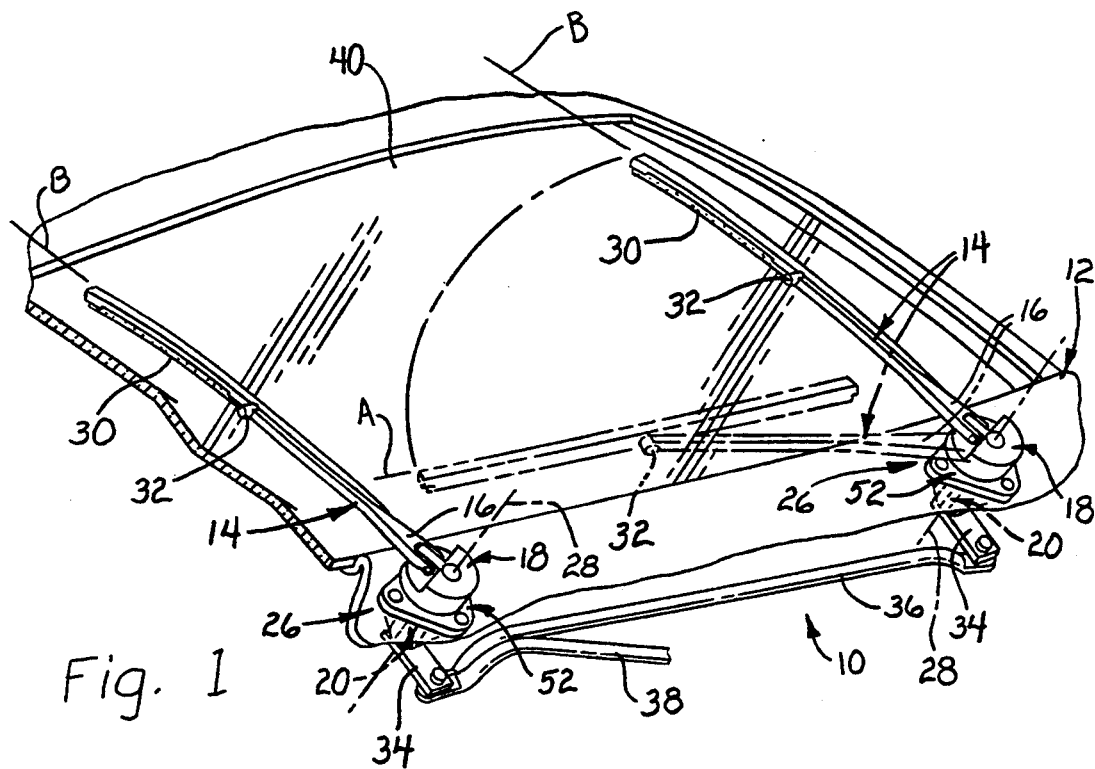
FIG. 1 is a perspective view of a vehicular wipershield wiper system having a pair of wiper arms, wherein each is driven by a variable pressure arm mechanism according to the present invention.

A windshield wiper system indicated generally at 10 in FIG. 1 is mounted on a vehicular body panel 12. The wiper system 10 includes a pair of laterally-spaced, rotatable wiper arms 14. Each wiper arm 14 is pivotally fixed at a first end 16 to a respective head 18 rotated by a drive shaft 20. The head 18 is secured to the drive shaft 20 by a nut 22. A cap 24 is placed over the nut 22 to prevent contaminants from entering the assembly. Each drive shaft 20 is rotatably mounted in a variable pressure arm mechanism 26 described below. Each drive shaft 20 defines a pivot axis 28 about which a wiper arm 14 rotates. A blade 30 is attached to a second end 32 of each wiper arm 14.

Each drive shaft 20 is fixed to a first end of a drive arm 34. An operating link 36 connects a second end of both drive arms 34. Pivotally connected to a second end of one of the drive arms 34 is a first end of a drive link 38. A second end of the drive link 38 is pivotally connected to a suitable crank arm, drive shaft, motor and gear combination, none of which are illustrated. Each wiper arm 14 is rotated across a windshield 40 between an inner wipe position A and an outer wipe position B as the drive shafts 20 are rotated by the system 10.

Figure 2:
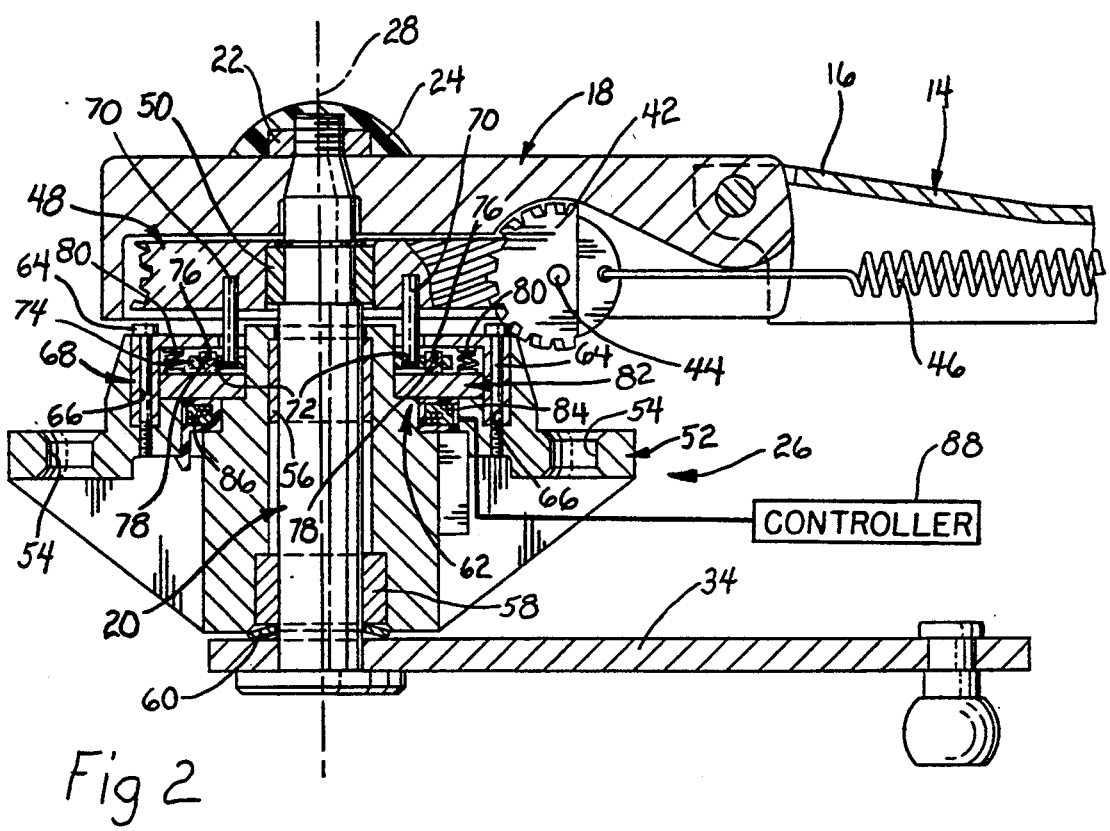
FIG. 2 is a sectional view of one of the variable pressure arm mechanisms of FIG. 1.
Figure 3:
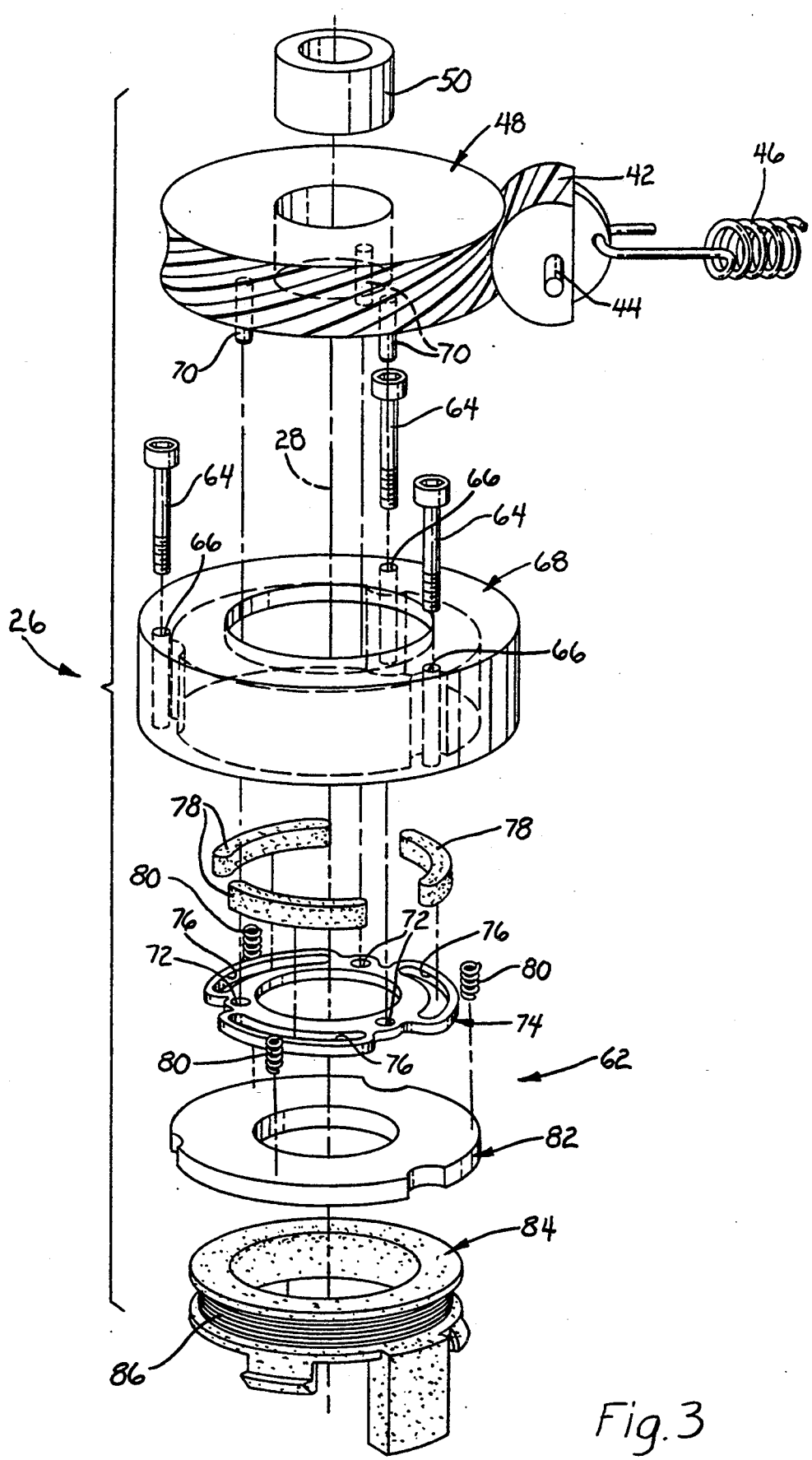
FIG. 3 is an exploded perspective view of the variable pressure arm mechanism illustrative a worm and worm gear combination and a electro-magnetic brake.

The variable pressure arm mechanism 26 selectively varies the blade tip force on the windshield 40 as the system 10 is operated. The mechanism 26 includes a worm gear 42 rotatably mounted on a pin 44 formed on the head 18 as illustrated in FIG. 2. A first end (not illustrated) of a tensioning spring 46 is pinned to the wiper arm 14, while a second end of the spring 46 is pinned to the worm gear 42. As the worm gear 42 rotates about it axis, the length of the spring 46 changes, as well as the angle of the spring 46 with respect to the wiper arm 14. By selectively varying the stretched length of the tensioning spring 46 and the angle of the spring 46 with respect to the wiper arm 14, the tip force on the windshield 40 can be varied.

Rotation of the worm gear 42 is accomplished through its mating with a worm 48. A bearing 50 is pressed into the worm 48 so that it can be slipped onto the drive shaft 20. The worm 48 is selectively coupled and decoupled to a pivot housing 52 as described below. The pivot housing 52 is rigidly mounted to the body panel 12 by fasteners (not illustrated) received in openings 54. Bearings 56 and 58 are pressed into the pivot housing 52 to receive the drive shaft 20. A spring washer 60 is slipped on the drive shaft 20 to take up axial play from assembly and part tolerances.

When the worm 48 is decoupled from the pivot housing 52, and the wiper system 10 is activated, the mated worm 48 and worm gear 42 rotate together provided that the gearing is non-backdriveable. When the worm 48 is coupled with the pivot housing 52, and the wiper system 10 is in operation, the worm 48 remains stationary while the worm gear 42 revolves about the worm 48. The revolution of the worm gear 42 about the worm 48 causes the worm gear 42 to rotate on its axis, thus increasing or decreasing the stretched length of the tensioning spring 46 and varying the blade tip force.

Coupling and decoupling of the worm 48 with the pivot housing 52 is accomplished by an electromagnetic clutch 62 mounted in the upper portion of the pivot housing 52. A plurality of fasteners 64 are received in respective openings 66 in a brake housing 68 and secured to the pivot housing 52. A plurality of pins 70 extend downwardly from the worm 48 and are received in respective openings 72 in a carrier plate 74. When the worm gear 42 is rotated, the pins 70 of the worm 48 cause the carrier plate 74 to rotate with the worm gear 42. The carrier plate 74 also includes slots 76 for containing a plurality of reciprocating pads 78 formed from a high friction material. When the clutch 62 is not energized, a plurality of springs 80 urge a plunger 82 formed as a steel plate away from the brake housing 68. When the brake housing 68 and plunger 82 are held apart by the springs 80, the carrier plate 74 is free to rotate.

A bobbin 84 contains a winding 86 which is connected to a controller 88, preferably an electronic control unit such as microprocessor. When the clutch 62 is energized by the controller 88, electromagnetic forces repel the plunger 82 upwardly toward the brake housing 68. This movement causes the friction pads 78 to be statically held between the plunger 82 and the brake housing 68, thus preventing rotation of the carrier plate 74. When the carrier plate 74 is prevented from rotating, the worm 48 cannot rotate. Thus, the worm 48 is coupled with the pivot housing 52.

In operation, the drive shaft 20 is oscillated by the drive link 38 when the wiper system 10 is activated by a driver. The controller 88 senses that the wiper system 10 has been activated and receives inputs such as vehicle velocity. If the vehicle velocity is low, no adjustment is made in the blade tip force. However, if the vehicle velocity falls into a higher range of values, the tip force can be adjusted. A finite number of high velocity ranges can be detected to produce a finite number of tip force adjustments. Once the controller 88 determines a change in tip force is required, the wiper motor output shaft position can be determined to calculate where a wiper arm 14 is in the wipe pattern. When the wiper arm 14 is moving towards position B, the tip force can be either increased or decreased, and when the wiper arm 14 is moving towards position A, an opposite tip force adjustment is possible. An appropriate sensing device, such as a Hall sensor, is located in the wiper motor to sense the output shaft position. The wiper motor output shaft rotary position is initialed to zero to set the position of the worm gear 42 relative to its position at start-up.

The controller 88 also determines the position of the worm gear 42 relative to its position when the wiper system 10 was activated. An appropriate device, such as a Hall sensor, is placed in the head casting 18 to detect the position of the worm gear 42. The worm gear 42 position is initialized to zero whenever the wiper system 10 is activated by the driver.

Once the controller 88 determines the vehicle velocity, the position of the wiper arm 14 in the wipe pattern, and the position of the worm gear 42, a calculation for when and how long the energize to the clutch 62 can be made to make a desired adjustment in tip force. When the wiper system 10 is turned off by the driver, the controller 88 commands the variable pressure arm mechanism 26 to return the worm gear 42 back to its original position when the wiper system 10 was first turned on by the driver. The controller 88 can be remotely located from the pivot housing 52 and is connected to the variable pressure arm mechanism 26 by a wiring harness (not illustrated) provided on the pivot housing 52.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A variable pressure windshield wiper arm assembly comprising:
   (a) a drive shaft rotatably mounted in a housing;
   (b) a head rigidly mounted on the drive shaft for unitary rotation therewith;
   (c) an elongated wiper arm having first and second ends wherein one end is pivotally connected to the head for unitary rotation therewith and the other end is connected to a wiper blade;
   (d) a worm rotatably mounted concentric with the drive shaft;
   (e) a worm gear rotatably mounted on the head and drivingly engaged by the worm;
   (f) a spring connected at a first end thereof to the worm gear and at a second end thereof to the wiper arm;
   (g) a carrier plate rotatably fixed to the worm and receiving a plurality of friction pads;
   (h) a magnetically susceptible plunger mounted concentric with the driveshaft and rotatably fixed and translationally movable relative to the housing;
   (i) spring means urging the magnetically susceptible plunger away from the carrier plate;
   (j) means for generating an electromagnetic force being selectively energized to operably bias the magnetically susceptible plunger against the friction pads to prevent rotation of the carrier plate and the worm by fixing them relative to the housing; and
   (k) control means for selectively energizing the means for generating an electromagnetic force, thereby fixing the worm to the housing.

2. The wiper arm assembly specified in claim 1 wherein the means for generating an electromagnetic force is a winding on a bobbin.

* * * * *